Dec. 3, 1929.  J. REIDENBAUGH  1,738,205
VEHICLE JACK
Filed Oct. 26, 1927   2 Sheets-Sheet 1
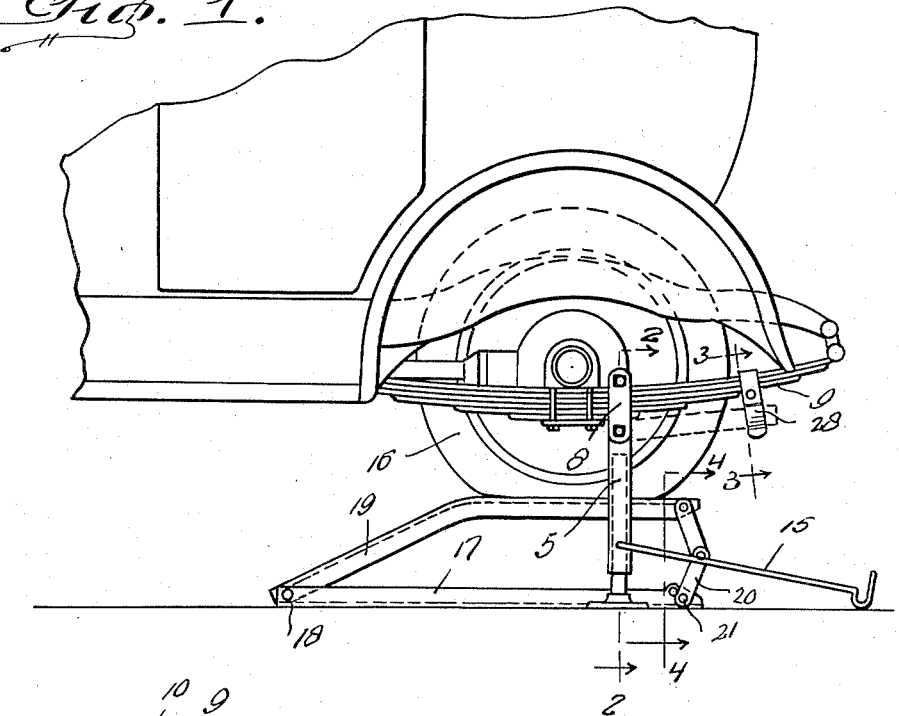
Fig. 1.
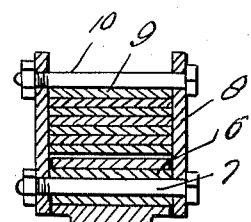
Fig. 2.
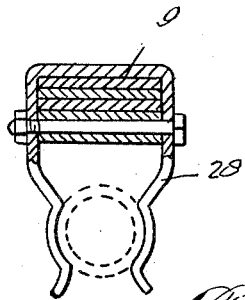
Fig. 3.
Inventor
John Reidenbaugh,
By 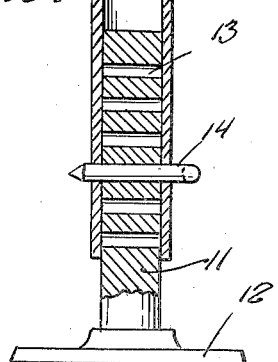
Attorney Dec. 3, 1929.  J. REIDENBAUGH  1,738,205
VEHICLE JACK
Filed Oct. 26, 1927   2 Sheets-Sheet 2

Inventor
John Reidenbaugh

By Clarence A. O'Brien
Attorney

Patented Dec. 3, 1929

1,738,205

UNITED STATES PATENT OFFICE

JOHN REIDENBAUGH, OF MARION, OHIO

VEHICLE JACK

Application filed October 26, 1927. Serial No. 228,862.

The present invention relates to jacks for vehicles and has for an object to provide a support permanently attached to the vehicle adjacent each wheel thereof and adapted to be moved into and out of engagement with the ground whereby to support each wheel of the vehicle in elevated position.

The invention also has for an object to provide a collapsible ramp upon which the vehicle may be driven under its own power for raising the wheels to the desired elevation enabling the support to be moved into engaged position with the ground, after which the ramp is adapted to be moved with the vehicle retained in its elevation position upon the support.

A further object of the invention is to provide means for carrying the support in an out-of-the-way position when not in use.

A still further object is to provide an apparatus of this character of simple and practical construction, strong and durable, adapted to be equally and quickly arranged in jacking position, relatively inexpensive to manufacture and otherwise well adapted for the purpose for which the same is intended.

Other objects and advantages reside in the special construction and combination of the various elements comprising the invention, reference being had to the accompanying drawings forming a part hereof, wherein:

Figure 1 is a view in side elevation showing the apparatus in jacking position,

Figure 2 is a vertical sectional view taken along a line 2—2 of Figure 1,

Figure 3 is a similar view taken along a line 3—3 of Figure 1,

Figure 4:
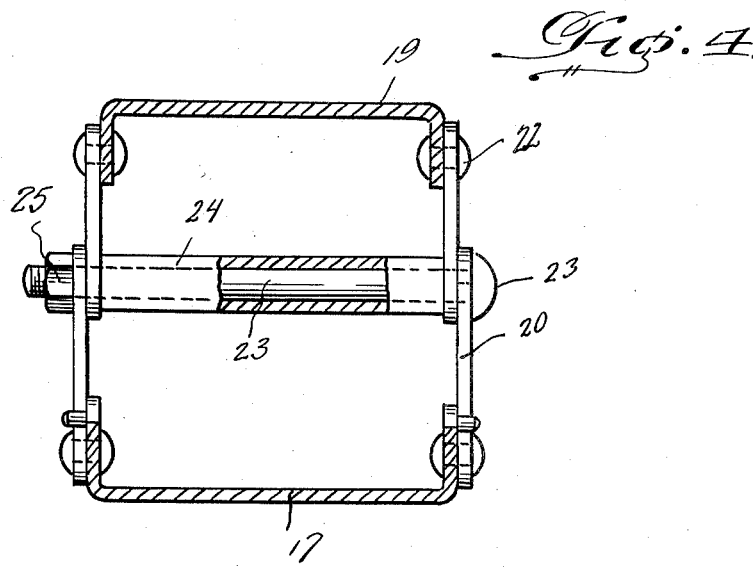
Figure 4 is a similar view taken through the rear end of the ramp along a line 4—4 of Figure 1.
Figure 5:
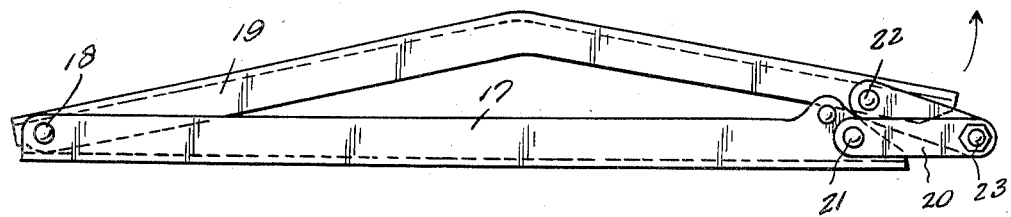
Figure 5 is a side elevational view of the ramp in collapsed position.

Referring to the drawings in detail. I have illustrated my invention comprising a vehicle support formed of a tubular arm indicated at 5 having its upper end formed into a bearing 6 through which a pin 7 is extended providing a pivotal connection for the upper end of the arm, the ends of the pin having a pair of spaced parallel plates 8 arranged thereon to form a spring attaching clip, the clip being retained on the spring 9 of the vehicle by means of a post 10 extending between the upper ends of the clip toward the top of the spring.

The lower end of the arm 5 is opened and adapted to slidably receive a post 11 arranged on a base 12 forming a foot for the support adapted to rest upon the ground for supporting the vehicle in elevated position as is shown in Figure 1 of the drawings.

A plurality of horizontally extending openings 13 are formed in the posts 11 adapted for registering with similar openings formed in the arm 5 whereby to receive a pin 14 carried at one end of a rod 15 providing means for inserting the pin in such openings by the operator stationed at substantially a remote distance therefrom.

A collapsible ramp is provided upon which the wheels 16 of a vehicle may be run whereby to elevate the same a desired distance to enable the engagement of the base 12 with the ground for supporting the vehicle in elevated position. The ramp comprises a base section 17 having a pivot pin 18 arranged at one end thereof to which one end of the upwardly inclined track section 19 of the ramp is pivotally attached. At the opposite end of the ramp, the base 17 and track section 19 are connected at each side by a pair of links 20 pivotally attached by pins 21 and 22 arranged respectively on the base and track section, with the opposite ends of the links connected by a bolt 23. The bolt extends between the link and each side of the ramp and carries the sleeve 24 adapted to retain the links in spaced relation as shown in Figure 4 of the drawings. The bolt 23 forms a pivot for the link enabling the adjacent end of the track section 19 to freely move relative to the base 17 and at one end of the bolt a nut 25 is provided by means of which the link may be tightened against the opposite ends of the sleeve to retain the track section in adjusted position.

Figure 6:
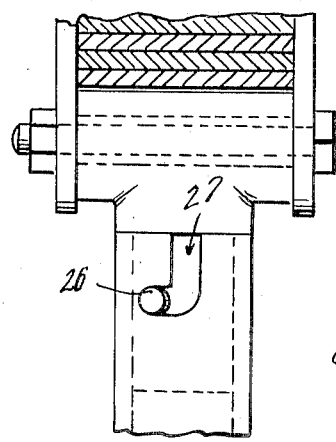
Figure 6 shows a modified form of attaching the telescoping sections forming the support.

In Figure 6 of the drawing I have illustrated a modified form of attaching the arms 5 and post 11 comprising a laterally extending pin 26 carried by the arm adapted to be inserted in a bayonet slot 27 formed at the inner end of the post and by means of which the parts may be secured in assembled position with respect to each other.

In placing the apparatus in operation the track section 19 of the ramp is arranged in spaced relation from the base 17 thereof and secured in such position by tightening the nut 25. The wedge shaped end of the ramp is then placed adjacent the tire of the wheel which is desired to be jacked and the vehicle is then operated under its own power to cause the wheel to ride upon the ramp. The arm 5 of the support with the post and base 12 arranged therein is then lowered into a vertical position as is shown in Figure 1 of the drawings and the pin 14 carried at the end of the rod 15 is inserted in suitable openings 13 of the arm and post for securing the same in extended position with respect to each other. The nut 25 may then be loosened which will permit the collapsing of the ramp, the support then serving to retain the wheel in elevated position.

In lowering the vehicle the ramp is again placed under the wheel after which the pin 14 is removed from the support which is then relieved of the weight of the vehicle whereupon the vehicle may then be run off the inclined base of the ramp. The post 11 may then be removed from the arm 5 and the arm swung into a horizontal position with its free end retained in a spring clip 28 attached to the spring 9 of the car.

The collapsed ramp as well as the post 11 of the support and rod 15 may then be conveniently stored in the car until desired for further use.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

1. A collapsible vehicle ramp comprising a pair of channel plates including a base plate and a wheel supporting plate having their channeled faces disposed in opposed relation, and pivotally attached at one end, a sectional link pivotally connecting the opposite ends of the plates at each side of the channels thereof and common pivotal means connecting the associated sections of the links and adapted for securing the wheel supporting plate in vertically adjusted position.

2. A collapsible vehicle ramp comprising a pair of channel plates including a base plate, and a wheel supporting plate having their channeled faces disposed in opposed relation and pivotally attached at one end, a pair of spaced parallel sectional links disposed at opposite sides of the plates and pivotally connected at each end to the respective plate, a bolt disposed transversely of the plates and providing a pivotal connection for the sections of the respective links at each side of the plates, a sleeve carried by the bolt forming a spacing member for the links, and a nut threaded on one end of the bolt and arranged to secure the sections of the links against movement with the wheel supporting plate in vertically adjusted position.

In testimony whereof I affix my signature.

JOHN REIDENBAUGH.